United States Patent
Park et al.

(10) Patent No.: US 11,397,845 B2
(45) Date of Patent: Jul. 26, 2022

(54) METHOD OF DISPLAYING TEXT OF ELECTRONIC DOCUMENT ON SCREEN OF INFORMATION TERMINAL

(71) Applicant: Korea Media Co., Ltd., Seoul (KR)

(72) Inventors: Gyu-Jin Park, Gyeonggi-do (KR); Ji-Soon Lim, Seoul (KR)

(73) Assignee: Korea Media Co., Ltd., Seoul (KR)

( * ) Notice: Subject to any disclaimer, the term of this patent is extended or adjusted under 35 U.S.C. 154(b) by 0 days.

(21) Appl. No.: 17/292,734

(22) PCT Filed: Jul. 17, 2020

(86) PCT No.: PCT/KR2020/009412
§ 371 (c)(1),
(2) Date: May 11, 2021

(87) PCT Pub. No.: WO2021/015495
PCT Pub. Date: Jan. 28, 2021

(65) Prior Publication Data
US 2021/0397779 A1    Dec. 23, 2021

(30) Foreign Application Priority Data
Jul. 19, 2019   (KR) .................. 10-2019-0087292

(51) Int. Cl.
*G06F 40/166*   (2020.01)
*G06F 40/109*   (2020.01)
(Continued)

(52) U.S. Cl.
CPC ........ *G06F 40/166* (2020.01); *G06F 3/04842* (2013.01); *G06F 3/14* (2013.01); *G06F 40/109* (2020.01)

(58) Field of Classification Search
CPC ...... G06F 40/166; G06F 3/04842; G06F 3/14; G06F 40/109
See application file for complete search history.

(56) References Cited

U.S. PATENT DOCUMENTS

2004/0025111 A1*   2/2004   Park ................... G06F 3/14
                                                      715/201
2010/0315359 A1   12/2010   Seong
(Continued)

FOREIGN PATENT DOCUMENTS

JP   2018/142228 A   9/2018
KR   2001/0087097 A   9/2001
(Continued)

OTHER PUBLICATIONS

International Search Report for PCT/KR2020/009412, dated Oct. 22, 2020, 2 pgs.

*Primary Examiner* — Pei Yong Weng
(74) *Attorney, Agent, or Firm* — Blank Rome, LLP

(57) ABSTRACT

A method of displaying text of an electronic document on a screen of an information terminal is proposed. The method includes: selecting a specific electronic document by a user; assigning new tags to all text of a corresponding electronic document selected by the user in units of words or letters so as to objectify the text; designating one page of text displayed on a screen of the information terminal by calculating a last word or a last letter at the bottom of that screen that may be displayed on a screen of the information terminal to the extent of not infringing the copyright of the electronic document; and selecting and performing a sequential display mode, a sequential disappearance mode, and an emphasis part designation mode, thereby allowing rapid reading training and enabling quicker review/revision of the parts that have already been studied and understood by a learner.

8 Claims, 1 Drawing Sheet

(51) Int. Cl.
*G06F 3/04842* (2022.01)
*G06F 3/14* (2006.01)

(56) References Cited

U.S. PATENT DOCUMENTS

| | | | |
|---|---|---|---|
| 2015/0186350 A1* | 7/2015 | Hicks | G06F 3/0488 |
| | | | 715/230 |
| 2015/0199306 A1* | 7/2015 | Phillips | G06F 40/109 |
| | | | 715/251 |
| 2016/0034429 A1* | 2/2016 | Wu | G06F 40/114 |
| | | | 715/251 |

FOREIGN PATENT DOCUMENTS

| | | |
|---|---|---|
| KR | 2002/0011933 A | 2/2002 |
| KR | 2003/0059855 A | 7/2003 |
| KR | 2010/0137307 A | 12/2010 |
| KR | 2012/0123752 A | 11/2012 |
| KR | 2017/0007106 A | 1/2017 |
| WO | WO-02/12994 A1 | 2/2002 |

* cited by examiner

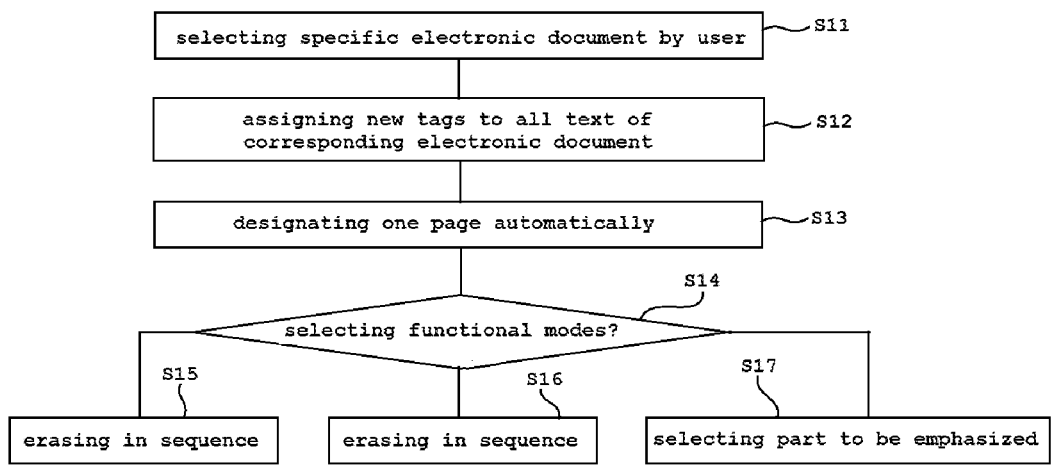

METHOD OF DISPLAYING TEXT OF ELECTRONIC DOCUMENT ON SCREEN OF INFORMATION TERMINAL

RELATED APPLICATIONS

This application is a national phase of PCT/KR2020/009412, filed on Jul. 17, 2020, which claims the benefit of Korean Patent Application No. 10-2019-0087292, filed on Jul. 19, 2019. The entire contents of these applications are hereby incorporated by reference.

TECHNICAL FIELD

The present disclosure relates to a method of displaying text of an electronic document on a screen of an information terminal that performs an operation such as sequentially displaying or erasing the text of the electronic document in units of one word or one letter to the extent of not infringing on a copyright such as not applying modification of the text of the electronic document, the modification applying to a font type, a line spacing, etc. of the text displayed in a web document or an e-book (hereinafter referred to as "electronic document") on the screen of the information terminal such as a PC, a notebook, a tablet PC, and a smartphone. More particularly, the present disclosure relates to a method of displaying text of an electronic document on a screen of an information terminal, wherein the method performs steps, including: selecting a specific electronic document by a user; assigning new tags to all text of a corresponding electronic document selected by the user in units of words or letters so as to objectify the text; designating one page of text displayed on a screen of the information terminal by calculating a last word or a last letter at the bottom of that screen that may be displayed on a screen of the information terminal to the extent that a copyright is not infringed by not modifying the original edited form including font type, word spacing, and line spacing of the text displayed in the electronic document; and designating one page of the text displayed on one screen of the information terminal, the designating of one page including determining one page of the text displayed on the screen by calculating the last word or the last letter at the bottom of the screen that may be displayed on one screen of the information terminal in a state where no deformation is applied to the font type, word spacing, and line spacing of the text displayed in the electronic document based on the screen pixels of the information terminal and displaying the next word or letter at the bottom of the screen of the one page or the next word or letter at the top of the next page of the screen, thereby allowing rapid reading training and enabling quicker review/revision of the parts that have already been studied and understood by a learner without modifying the existing expression form of the electronic document and infringing on a copyright.

BACKGROUND ART

For the purpose of improving a learner's speed-reading ability, the learner is trained using methods of speeding up rolling of the eyeballs or expanding focus to see many letters at once in order to identify and read the letters quickly by the learner rolling his or her eyeballs when reading a document. Among those methods, in year 1999, a fast reading method using a display device was invented, and there was introduced a technology that is characterized by a method in which letters of a document are sequentially displayed or erased according to a user's reading speed while the eyes remain passive in movement.

However, the disclosure is limited to text documents due to its characteristics, and does not reflect the reality of recent document production in which various graphics such as text, photos, and tables are mixed and edited. For a document in which various fonts are used and various colors are mixed, a fast reading effect may be realized only with a single size and one color, for example, black and white monotone, but when trying to read, in so-called speed-reading mode, various web documents searched through a search engine such as Google, need has emerged wherein a user should be enabled to naturally move his or her focus by sequentially displaying or erasing the diversity of fonts, colors, and effects that are displayed in units of words (or letters) expressed as they are without damaging the original edited version itself. The reason for the necessity is that an era has come when speed-reading training and speed reading itself have become a part of a reading life.

Therefore, when reading not only web documents but also e-books conforming to standard document specification such as ePub (electronic publication), due to the characteristics of literary work, the need for generation an effect of sequentially displaying or erasing text, while making use of the various expression of letters and arrangement of sentences (including spaces) for the impression of such books has emerged.

A technology for a method of displaying text data of an electronic document as described above has been proposed in Korean Patent Application Publication Nos. 10-2010-0137307 and 10-2012-0123752.

DISCLOSURE

Technical Problem

An objective of the present disclosure is to provide a method of displaying text of an electronic document on a screen of an information terminal, wherein the text of the electronic document is sequentially displayed or disappears in units of one word or one letter to the extent of not modifying the electronic document such as a web document or an e-book on the screen of the information terminal such as a PC, a notebook, a tablet PC, and a smartphone, and not infringing on a copyright, so as to allow a fast reading training and quicker review/revision of the parts that have already been studied and understood by a learner without modifying the existing expression form of the corresponding electronic document and infringing a copyright.

Technical Solution

According to the present disclosure to achieve the above objective, a method of displaying text of an electronic document on a screen of an information terminal includes: selecting a specific electronic document by a user; assigning new tags in units of words or letters to all text of a corresponding electronic document selected by the user to objectify the text; designating one page of the text displayed on the screen of the information terminal by calculating a last word or last letter at a bottom of the screen, the last word or last letter being able to be displayed on the screen of the information terminal, to an extent of not modifying an original edited form of electronic documents so as not to infringe on a copyright; and selecting and performing any one mode from functional modes comprising a sequential display mode in which one letter or one word of the text is sequentially displayed on the screen and a sequential disappearance mode in which all text is displayed on one page of the electronic document displayed on the screen and then one letter or one word disappears sequentially.

In addition, in the present disclosure, in the designating of one page of the text displayed on the screen of the information terminal, one page of the text displayed on the screen may be determined by calculating the last word or last letter at the bottom of the screen that is displayed on the screen of the information terminal in a state in which no modification is applied to the font type, word spacing, and line spacing of the text displayed in the electronic document based on screen pixels of an information terminal, and then the next word or letter of the last word or last letter at the bottom of the screen may be displayed on a first word or first letter of a top of a next page of the screen.

In addition, in the present disclosure, in the sequential display mode, all text of the electronic document that has been objectified may be made transparent, and then sequentially made opaque by one letter or one word, so that the text may be sequentially displayed on the screen by one letter or one word.

In addition, in the present disclosure, in the sequential disappearance mode, all text of the corresponding electronic document that is objectified may be displayed on one page of the screen, and then each letter or word may be made sequentially transparent so as to disappear on the screen sequentially by one letter or one word.

In addition, in the present disclosure, the functional modes may further include an emphasis part designation mode in which the user designates a part to be emphasized after displaying all text of one page on the screen.

In addition, in the present disclosure, the emphasis part designation mode may be for designating the part to be emphasized using any one of a finger, an electronic pen, and a mouse cursor in the part to be emphasized by the user after displaying all text of the corresponding electronic document that is objectified on one page of the screen, the part emphasized may be an emphasis part emphasized by displaying a display unit of the text (i.e., one letter, one word, one line, and one paragraph) by any one of methods adding underline, dark text, shade color, fluorescent color, and border, and in a case where the emphasis part is designated in the text of the electronic document, when the text is displayed on the screen, only the emphasis part may be first displayed sequentially from an originally emphasized position before remaining letters are displayed in a corresponding page.

In addition, in the present disclosure, in a process where a sequential display mode or a sequential disappearance mode is selected to proceed with a corresponding mode, when an event occurs in which the user scrolls a particular word or letter on the screen by manipulating any one of a finger, electronic pen, or a mouse cursor, the first word at the top and the last word at an end of the page displayed at a point where a scroll is completed may be newly calculated, so that the page may be newly decided, In addition, in the present disclosure, the method may be configured to make it easy for the user to move his or her focus naturally from the last word at the bottom of a previous page to the first word at the top of the next page by using at least any one of the methods among a method of giving a delay with a predetermined amount of time (i.e., 0.5 to 3 seconds) at a part where the last word at the bottom of the page is displayed or disappears when switching the page, a method of emphasizing in bold or highlight at a time when a word of the top of the next page or the last word at the end of the page is displayed, and a method of changing a background color of the screen of an entire page for a short period of time (i.e., 0.5 to 3 seconds) immediately before moving to the next page from the part where the last word at the bottom of the page is displayed or disappears.

In addition, in the present disclosure, the method may be configured to allow a display or disappearance speed to be sequentially designated in a sequential display mode or a sequential disappearance mode, and to allow the sequential display or disappearance speed to designated equally with a single designation, and to allow an execution speed of the sequential display or the sequential disappearance to be respectively designated in the sequential display mode or the sequential disappearance mode so as to receive new command events even during an execution, whereby the mode and speed is able to be changed at any time according to a user's situation and selection.

Advantageous Effects

A method of displaying texts of an electronic document on a screen of an information terminal according to the present disclosure has an effect in that the method performs steps, including: selecting a specific electronic document by a user; assigning new tags to all text of the corresponding electronic document selected by the user to objectify the text; designating one page of the text that may be displayed on a screen of the information terminal by calculating the last word or last letter at the bottom of the screen displayed on a screen of the information terminal to the extent of not modifying the original edited form of the electronic document and not infringing on a copyright; and selecting and performing a sequential display mode, a sequential disappearance mode, and an emphasis part designation mode, thereby allowing a fast reading training and quicker review/revision of the parts that have already been studied and understood by a learner without modifying the existing expression form of the corresponding electronic document and infringing a copyright. In addition, the present disclosure has an effect in that existing documents may be immediately read in a speed-reading mode without the need to newly process various and large amounts of document data that have already been published as web documents or e-books, that is, without the need to separately produce documents for speed reading.

In addition, the present disclosure has an effect in that in the state where the font type, word spacing, and line spacing of the text displayed in the electronic document based on the screen pixel of the information terminal are not modified, the text displayed on a screen (i.e., one page) of the display is determined by calculating the last word or the last letter at the bottom of the screen that may be displayed on a screen of the information terminal, so that when one letter or one word reaches the end of the page in accordance with the display or disappearance speed of one letter or one word on the screen above, the next word or next letter is displayed at the top of the next page screen as the next page is switched, whereby page switching is automatically implemented sequentially without difficulty. In this way, when viewing electronic documents such as web documents or e-books, compared to a paper book, a user may avoid the trouble of turning the pages one by one, and automatic page turning that matches the reading speed of the reader is possible, so that even in the case of disabled people who are inconvenient to turn pages, there is an effect in that the user may read, without discomfort, faster than normal people who do not use this functionality.

In addition, the present disclosure has an effect in that in a process where the sequential display mode or the sequential disappearance mode is selected to proceed with a corresponding mode, when an event of scrolling the page occurs by a user manipulating any one of a finger, electronic pen, or mouse cursor, the first word at the top and the last word at bottom of the page displayed at a position where the scroll is completed are newly calculated, so that the page is newly decided, whereby it is possible that the display or disappearance of one word or one letter is performed very stably even when an unexpected event occurs by the user, and automatic page switching is performed smoothly when the end of a new page is reached.

DESCRIPTION OF DRAWINGS

FIG. 1 is a flowchart of a method of displaying text of an electronic document on a screen of an information terminal according to the present disclosure.

MODE FOR INVENTION

The method of displaying text of the electronic document on the screen of the information terminal according to the present disclosure relates to a method of displaying text of an electronic document on a screen of an information terminal, wherein operations, such as sequentially displaying or erasing text of the electronic document in units of one word or one letter, are performed without infringing on a copyright, such as not modifying the electronic document text such as the font type and line spacing, of the text displayed in a web document or an e-book (hereinafter referred to as "electronic document") on the screen of the information terminal such as a PC, a notebook, a tablet PC, and a smartphone. The method will be described as follows with reference to the accompanying drawings, etc.

As shown in FIG. 1, a method of displaying text of an electronic document on a screen of an information terminal according to the present disclosure includes: selecting a specific electronic document by a user (i.e., step S11); assigning new tags to all text of the corresponding electronic document selected by the user to objectify the text (i.e., step S12); and designating one page of the text displayed on a screen of the information terminal by calculating the last word or last letter at the bottom of the screen, the last word or last letter being displayed on a screen of the information terminal for an original document, to the extent of not modifying the original edited form of the electronic document and not infringing on a copyright (i.e., step S13). In addition, the user may select a function such as displaying text on the screen (i.e., step S14), and functional modes includes: a sequential display mode of displaying one letter or one word of the text in sequence (i.e., step S15); a sequential disappearance mode of displaying all text of one page of the electronic document displayed on the screen before making one letter or one word disappear in sequence (i.e., step S16); and an emphasis part designation mode in which all text of one page of the screen is displayed before the user designates a part to be emphasized (i.e., step S17), and the user may select any one mode he or she wants to perform the function of from the functional modes described above.

In principle, the present disclosure does not apply a modification to text of a web document or e-book, the text including such as font type, word spacing, line spacing, etc. displayed on an electronic document, which is the web document or e-book, in order not to infringe on a copyright for the corresponding electronic document and not to cause disputes on an editorial copyright. That is, it is a principle not to modify a form of an original document, except for the size of one page of an e-book, caused by a variety of screen standards of a device.

A process of assigning new tags to the text and objectifying the text in step S12 will be described as follows.

Among electronic documents, a web document is composed of html, which is the standard specification, and an ePub (Electronic publication) document, which is the standard specification for e-books, uses a specification called xhtml. A user selects a specific electronic document, and at the same time, assigns a tag to every word from the beginning to the end of the text of the corresponding electronic document, thereby objectifying the corresponding electronic document.

In an electronic document,
for a process of assigning tags to the electronic document, for example,
"The first question, of course, was how to get dry again.
They had a consultation about this and after a few minutes,
It seemed quite natural to Alice to find herself talking familiarly
with them, as if she had known them all of life."
is the text of an electronic document, and the process includes steps of
1) splitting the text of a html document into words,
2) assigning a predetermined tag to each separated word and objectifying the word as follows.

```
ex)
<km id="km0">The</km>
<km id="km1">first</km>
<km id="km2">question,</km>
<km id="km3">of</km>
<km id="km4">course,</km>
<km id="km5">was</km>
<km id="km6">how</km>
```

For web documents in the future, the principle of techniques remains unchanged in such a way that even when a format of html or ePub of e-book is changed, so that when there is a part expressing the text in the document format, new tags are assigned to the part so as to objectify the part, and then the electronic document is programmed to be executed from beginning to end of the electronic document.

A process of designating one page of text displayed on a screen of the information terminal in step S13 will be described as follows.

In the process of designating one page of the text displayed on a screen of the information terminal, the last word or last letter at the bottom of a screen that may be displayed on a screen of the information terminal is calculated in a state in which no modification is applied to font type, word spacing, and line spacing of text displayed in the electronic document based on screen pixels of an information terminal, and then one page of the text displayed on the screen is determined.

That is, based on the height of a screen pixel of the information terminal, the bottom of the page is determined based on the last word or last letter of the last sentence at the lowermost end of the screen, and then the next word is drawn and set as the first word or first letter of the next page.

This process is applied in the same way even when displaying or erasing in units of sentence or line. The method of determining the end of a page is just repeated by positioning the word or letter at the end of the sentence or line at the lowermost end of the page as the end of the corresponding page, positioning the first word or letter of the next sentence or line as the beginning of the next page, and arranging the next text all the way to the end to fit the height of the pixels of the screen.

The modes that may be selected from the above functional modes (i.e., S14 step) includes: a sequential display mode in which one letter or one word of the text is sequentially displayed on the screen (i.e., S15 step); a sequential disappearance mode in which the text is displayed on one page of the electronic document displayed on the screen all at once and then one letter or one word disappears in sequence (i.e., S16 step); and an emphasis part designation mode in which the user designates a part to be emphasized after displaying all text of one page of the screen (i.e., S17 step).

In the sequential display mode (i.e., step S15), all text of the electronic document that has been objectified is made transparent, and then sequentially made opaque each for one letter or one word, so that all text is sequentially displayed on the screen by one letter or one word. Such functions may be performed by sequentially applying and dynamically utilizing already known CSS (cascading style sheets) functions.

The CSS (cascading style sheets) function is a style sheet in which the overall style of a web document is stored in advance, the CSS having a function in which Web developers may design the web in a richer way, freely select or change font, line spacing, background color, and arrangement position, and also perform easy maintenance and repair. Accordingly, detailed descriptions thereof will be omitted because the function is a well-known technology.

In the sequential disappearance mode (i.e., S16 step), all text of the corresponding electronic document that is objectified is displayed on one page of the screen, and then each letter or word is made sequentially transparent so as to disappear on the screen sequentially by one letter or one word. Such functions may be performed by sequentially applying and dynamically utilizing the already known CSS (cascading style sheets) functions.

When the text of the document is processed in the sequential display mode or the sequential disappearance mode, in the case where the movement of display or disappearance reaches the last part at the bottom of the page, the next step is processed by starting from the first part of the top of the next page after automatically displaying the next page.

In the emphasis part designation mode (i.e., S17 step), after displaying all text of the corresponding electronic document that is objectified on one page of the screen, the part to be emphasized is designated using a finger, an electronic pen (e.g., an electronic pen used in Galaxy notes), and a cursor of a mouse in the part to be emphasized by the user. The emphasis part is the part where a display unit of the text (i.e., one letter, one word, one line, and one paragraph) is displayed by any one of methods adding underline, dark text, shade color, fluorescent color, and border, so as to be emphasized compared to other text. Such functions may take advantage of the already known CSS (cascading style sheets) functions.

In the case where the above-described emphasis part is designated on the text of the electronic document, when the text is displayed on the screen, only the emphasis part is first displayed sequentially from the originally emphasized position, and then the remaining letters are made to be displayed in the corresponding page.

In the functional modes (i.e., S14 step), the display or disappearance speed is able to be sequentially designated in the sequential display mode or the sequential disappearance mode, the display or disappearance speed is able to designate the display or disappearance speed equally with a single designation, and an execution speed of the display or the disappearance is respectively designated in the display mode or the disappearance mode so as to receive new command events even during an execution, whereby the mode and speed is able to be changed at any time according to the user's situation and selection.

As another exemplary embodiment of the present disclosure, when a page is switched sequentially, a method of compensating for a difficulty of a user's sudden movement of focus from the last word at the lowermost end of the previous page to the first word at the uppermost end of the next page is presented as follows.

The page is automatically calculated to give a delay with a predetermined short time (i.e., preferably 0.5 to 3 seconds) at a point of the end of a page, that is, at the point where the last word at the bottom of the page is displayed or disappears, or to emphasize the words with bold (i.e., Western typeface with thicker lines than normal typeface) or to highlight the words at a time when the last word of the previous page or the first word of the top of the next page is displayed, so that it is easy for the user to move his or her focus naturally from the last word at the bottom of the previous page to the first word of the top of the next page.

As another method of compensating for the difficulty of moving the user's focus to the next page when switching the page, the page is automatically calculated to change the background color of the entire page screen for a short period of time (i.e., preferably 0.5 to 3 seconds) at the point where one page ends, that is, the point just before going to the next page from the part where the last word at the bottom of the page is displayed or disappears, so that the appearance of the next page is predicted, whereby it may be easy for the user to move his or her focus naturally to the first word of the top of the next page.

In the case of switching the page as described above, when using at least one of the methods to compensate for the difficulty of moving the user's focus to the next page, the movement of the user's focus may also naturally follow the text display in a state where sequential display moves to the next page after the page is over, thereby having an effect of making user's eyes less tired.

As described above, the present invention has been described with reference to the practical exemplary embodiments. However, those skilled in the art will appreciate that various modifications, additions and substitutions are possible, without departing from the scope and spirit of the present invention as disclosed in the accompanying claims.

INDUSTRIAL APPLICABILITY

The method of displaying text of the electronic document on the screen of the information terminal relates to a method of displaying text of an electronic document on a screen of an information terminal, wherein operations, such as sequentially displaying or erasing text of the electronic document in units of one word or one letter, are performed without infringing on a copyright, such as not modifying the electronic document text such as the font type and line spacing, of the text displayed in an electronic document on the screen of the information terminal, and the present disclosure may be useful for the method of displaying text of the electronic document on the screen of the information terminal that allows a fast reading training and quicker review/revision of the parts that have already been studied and understood by a learner without modifying the existing expression form of the corresponding electronic document and infringing copyright.

The invention claimed is:

1. A method of displaying text of an electronic document on a screen of an information terminal, the method comprising:
   selecting a specific electronic document by a user;
   assigning new tags, each of which has its unique ID, in units of words to all text of the electronic document to objectify the words; and
   designating one page of the text displayed on the screen of the information terminal by calculating the last objectified word (hereafter word object) at a bottom of the screen, the last word object being able to be displayed on the screen of the information terminal, to an extent of not modifying an original edited form including font type, word spacing, and line spacing of the text displayed in electronic documents,
   wherein the designating of one page of the text displayed on the screen of the information terminal comprises determining one page of the text displayed on the screen by calculating the last word object at the bottom of the screen that is displayed on the screen of the information terminal in a state in which no modification is applied to the font type, word spacing, and line spacing of the text displayed in the electronic document based on screen pixels of the information terminal, and the next word object of the last word object at the bottom of the screen of one page is displayed on a first word object of a top of a next page of the screen, and
   wherein the user selects and performs any one mode from functional modes comprising a sequential display mode in which one word object of the text is sequentially displayed on the screen and a sequential disappearance mode in which all text is displayed on one page of the electronic document displayed on the screen and then one word object disappears sequentially.

2. The method of claim 1, wherein, in the sequential display mode, all text of the electronic document is made transparent, and then sequentially made opaque by one word object, so that the text is sequentially displayed on the screen by one word object.

3. The method of claim 1, wherein, in the sequential disappearance mode, all text of the corresponding electronic document is displayed on one page of the screen, and then each word object is made sequentially transparent so as to disappear on the screen sequentially by one word object.

4. The method of claim 1, wherein the functional modes further comprise an emphasis part designation mode in which the user designates a part to be emphasized after displaying all text of one page on the screen.

5. The method of claim 4, wherein
   the emphasis part designation mode is for designating the part to be emphasized using any one of a finger, an electronic pen, and a mouse cursor in the part to be emphasized by the user after displaying all text of the corresponding electronic document that is objectified on one page of the screen,
   the part emphasized is an emphasis part emphasized by displaying a display unit of the text (i.e., one word, one line, and one paragraph) by any one of methods adding underline, dark text, shade color, fluorescent color, and border, and
   in a case where the emphasis part is designated in the text of the electronic document, when the text is displayed on the screen, only the emphasis part is first displayed sequentially from an originally emphasized position before remaining word objects are displayed in a corresponding page.

6. The method of claim 1, wherein, in a process where a sequential display mode or a sequential disappearance mode is selected to proceed with a corresponding mode, when an event occurs in which the user scrolls a particular word object on the screen by manipulating any one of a finger, electronic pen, or a mouse cursor, the first word object at the top and the last word object at an end of the page displayed at a point where a scroll is completed are newly calculated, so that the page is newly decided.

7. The method of claim 1, configured to make it easy for the user to move his or her focus naturally from the last word object at the bottom of a previous page to the first word object at the top of the next page by using at least any one of the methods among a method of giving a delay with a predetermined amount of time (i.e., 0.5 to 3 seconds) at a part where the last word object at the bottom of the page is displayed or disappears when switching the page, a method of emphasizing in bold or highlight at a time when a word object of the top of the next page is displayed, and a method of changing a background color of the screen of an entire page for a short period of time (i.e., 0.5 to 3 seconds) immediately before moving to the next page from the part where the last word object at the bottom of the page is displayed or disappears.

8. The method of claim 1, configured to allow
   a display or disappearance speed to be sequentially designated in a sequential display mode or a sequential disappearance mode, and to allow
   the sequential display or disappearance speed to designated equally with a single designation, and
   to allow an execution speed of the sequential display or the sequential disappearance to be respectively designated in the sequential display mode or the sequential disappearance mode so as to receive new command events even during an execution, whereby the mode and speed is able to be changed at any time according to a user's situation and selection.

* * * * *